UNITED STATES PATENT OFFICE.

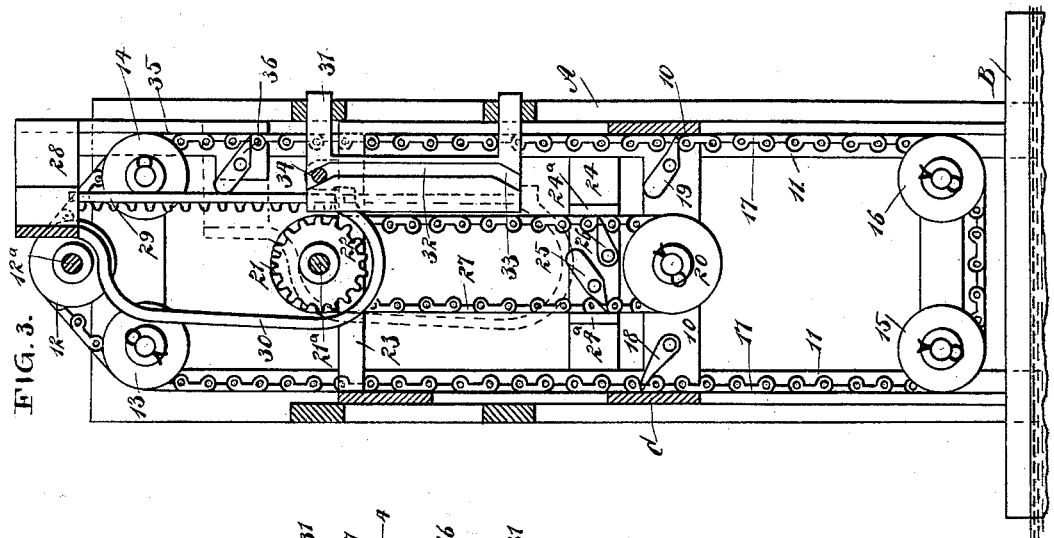

SILAS P. TOMKINS, OF TILLY FOSTER, NEW YORK.

TIDE-MOTOR.

SPECIFICATION forming part of Letters Patent No. 609,637, dated August 23, 1898.

Application filed February 10, 1898. Serial No. 669,827. (No model.)

*To all whom it may concern:*

Be it known that I, SILAS P. TOMKINS, of Tilly Foster, in the county of Putnam and State of New York, have invented a new and Improved Tide-Motor, of which the following is a full, clear, and exact description.

The object of my invention is to provide a motor of simple and economic construction and capable of operation by the rise and fall of the tide.

A further object of the invention is to provide a means whereby at the extreme ebb and flood of the tide the motor will continue to operate, the power for such purpose having been practically stored during the period of action of the tide.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the device, showing the position of the parts at the ebb of the tide. Fig. 2 is a vertical section through the device, taken at right angles to the section shown in Fig. 1, illustrating the position of the parts during the action of the tide on the motor. Fig. 3 is a section similar to Fig. 2, illustrating the float of the motor as having been carried up as far as possible by the tide; and Fig. 4 is a transverse section taken substantially on the line 4 4 of Fig. 2.

A represents a casing which may be of any approved construction and is adapted to be erected over a stream the water whereof ebbs and flows. The float B used in connection with the casing may be of any desired construction. A cage C is adapted to travel within the casing A. The said cage, as illustrated, consists of a frame the lower portion 10 whereof is connected with the float by uprights 11, and the lower portion 10 of the cage is connected with the upper portion 23 in any suitable or approved manner. The sides of the cage are usually cut away, as illustrated in Fig. 1, to form side recesses $23^a$ particularly and vertical side openings $23^b$.

At the upper portion of the casing a drive-shaft $12^a$ is mounted to revolve in suitable bearings, and the said drive-shaft is provided with two chain-wheels 12, located adjacent to the inner faces of the casing. Below the chain-wheels 12, at each side of the casing A, two other chain-wheels 13 and 14 are mounted to revolve, and at the bottom portion of each side of the casing A two chain-wheels 15 and 16 are mounted to turn, corresponding to the upper chain-wheels 13 and 14.

An endless chain 17 is provided for each side of the casing. Each endless chain is made to pass over the upper pulleys 12, 13, and 14 and around the lower pulleys 15 and 16, as illustrated in Figs. 2 and 3. Two dogs 18 and 19 are pivoted upon the lower cross-bar or lower portion 10 of the cage C at opposite sides of the said cage. The dogs of each pair are given an inclination in opposite directions, the dogs 18, for example, which engage with one vertical stretch of a chain, point upward while the dogs 19, which engage with the opposite vertical stretch of the chain, point downward, as shown in Figs. 2 and 3.

At each side of the bottom portion of the cage C a chain-wheel 20 is mounted to turn; but at the upper portion of the cage a shaft $21^a$ is mounted on the upper portion 23 of the cage, and this shaft carries two chain-wheels 21 and an intermediate gear 22, as shown in Figs. 1 and 2. Cross-bars 24 are provided for the casing A, as shown in Figs. 2 and 3, and each of the cross-bars 24 is provided upon its inner face with guides $24^a$. On the inner faces of the two cross-bars 24 two dogs 25 and 26 are pivoted, one of the said dogs pointing downward and the other upward. The dogs 25 and 26 are adapted to engage with the vertical stretches of chains 27, which are carried over the chain-wheels 20 and 21.

At the upper portion of the casing A a receptacle 28 is located, being adapted to receive a weight of any character. A rack 29 is attached to the weighted receptacle and extends downward, being supported at its lower end by a bracket 30, which bracket is usually attached to the weighted receptacle and is carried downward below the shaft upon which the upper chain-wheels 21 and the gear-wheel 22 are secured, as illustrated in both Figs. 2 and 3.

A frame 31 is secured to the casing A at one of its sides. This frame at each side is provided with a vertical slot 32, which at each of its ends is inclined inward or in direction of the chains 27, carried by the cage, the inwardly-extending end portions of the said slot being designated as 33 and being best shown in Figs. 2 and 3.

At the upper portion of the cage C, at opposite sides, an inwardly-extending pin 34 is secured, and these pins are arranged to travel in the slots 32. Members 35 are carried downward from the weighted receptacle 28, and the said members 35 at their lower ends are provided with extensions or enlargements which receive dogs 36, the said dogs being adapted for engagement with one of the vertical stretches of the endless chains 17, carried by the casing, as shown best in Fig. 3.

In the operation of the device as the tide rises the upwardly-inclined dogs 18, engaging with the endless chains 17, cause the said chains to move, consequently revolving the driving-shaft 12$^a$, and as the tide recedes the dogs 19 act upon the chains 17 to move them in the same direction, thus during the action of the tide in its ebb and in its flow imparting to the drive-shaft 12$^a$ a motion in the same direction. The guides 24$^a$ serve as bearings for the chains 27, as does likewise the cage C for the main chains 17. While the pins 34 travel in the straight portions of the grooves 32 of the frame 31, the rack 29 will be in engagement with the gear-wheel 22, carried by the cage; but when the pins 34 are in the inclined portions 33 of the groove 32 the rack 29 will be carried out of engagement with the said gear-wheel 22 and the weight in the box 28 is free to act and cause the rack 29 and the members 35, connected with the weighted box, to drop downward, whereupon the dogs 36, attached to the said members 35, through their engagement with the main endless chains 17 will cause the said chains to move in the same direction as though they were acted upon by the dogs of the cage influenced by the tide. As the cage travels downward the pins 34 reaching the straight portions of the grooves 32, the dogs 26, carried by the casing, will cause the supplemental chains 27 to turn, consequently carrying the rack 29 upward, bringing the weighted box practically to the position shown in positive lines in Fig. 2 and in dotted lines in Fig. 3, and when the tide is at its full ebb the pins 34 will be in the lower inclined portions 33 of the slots 32 of the said frame 31 and the weighted box will be free to drop once more and move the main chains. When the tide rises and the cage is carried upward, the supplemental chains 27 will be moved by the dogs 25 and the weighted box will be carried upward; but the upward movement of the weighted box will be in advance of the upward movement of the cage, so that when the cage by the flood of the tide has been carried to its upper position the weighted box will be considerably above the upper portion of the cage, as shown in Fig. 3.

Having thus described my invention, I claim as new and desire to secure by Letters Patent—

1. A tide-motor, comprising a float, a guide for the float, endless chains, a power-shaft operated by the said endless chains, a double series of pawls carried by the float and engaging the said chains, imparting a continuous movement thereto in one direction during the movement of the tide, an auxiliary driving device for the said chains, and a weight-motor arranged to operate the said auxiliary driving device, the weight-motor acting when the tide for the main motor is inactive, as specified.

2. In a tide-motor, the combination, with a movable float, a guide therefor, endless chains, a power-shaft operated by the said chains, a double series of pawls carried by the float and arranged to operate the said chains, imparting thereto a continuous movement in one direction during both the ebb and the flow of the tide, of an auxiliary weight-motor, comprising auxiliary chains carried by the float structure, dogs carried by the guides for the float and engaging with the auxiliary chains, a weight-receptacle provided with a guide-rack, the rack being in gear connection with the said auxiliary chains, dogs carried by the weight-receptacle and engaging with the main chains, and means, substantially as described, for carrying the rack at intervals out of gear with the said auxiliary chains, as specified.

SILAS P. TOMKINS.

Witnesses:
J. FRED. ACKER,
EVERARD BOLTON MARSHALL.